(12) United States Patent
Sinitsky et al.

(10) Patent No.: US 7,944,277 B1
(45) Date of Patent: May 17, 2011

(54) CIRCUIT AND METHODS OF ADAPTIVE CHARGE-PUMP REGULATION

(75) Inventors: Dennis Sinitsky, Los Gatos, CA (US); Shafiq M. Jamal, Gilroy, CA (US)

(73) Assignee: Marvell International Ltd., Hamilton (BM)

( * ) Notice: Subject to any disclaimer, the term of this patent is extended or adjusted under 35 U.S.C. 154(b) by 141 days.

(21) Appl. No.: 12/340,076

(22) Filed: Dec. 19, 2008

Related U.S. Application Data

(60) Provisional application No. 61/019,046, filed on Jan. 4, 2008.

(51) Int. Cl.
*G05F 1/10* (2006.01)
(52) U.S. Cl. .......................................... 327/536; 363/60
(58) Field of Classification Search .................. 327/536; 363/59–60
See application file for complete search history.

(56) References Cited

U.S. PATENT DOCUMENTS

| | | | |
|---|---|---|---|
| 5,818,766 A * | 10/1998 | Song | 365/189.11 |
| 6,049,201 A * | 4/2000 | Feldtkeller | 323/288 |
| 6,356,062 B1 * | 3/2002 | Elmhurst et al. | 323/282 |
| 6,400,211 B1 * | 6/2002 | Yokomizo et al. | 327/536 |
| 6,552,600 B2 * | 4/2003 | Walimbe et al. | 327/536 |
| 7,068,094 B1 * | 6/2006 | Jamal et al. | 327/541 |
| 7,250,810 B1 * | 7/2007 | Tsen | 327/536 |
| 7,504,877 B1 * | 3/2009 | Voogel et al. | 327/536 |
| 7,511,563 B2 * | 3/2009 | Botker et al. | 327/536 |
| 7,589,583 B2 * | 9/2009 | Yoshikawa et al. | 327/536 |
| 7,667,529 B2 * | 2/2010 | Consuelo et al. | 327/536 |
| 2008/0174288 A1 * | 7/2008 | Poles et al. | 323/273 |
| 2010/0110736 A1 * | 5/2010 | Gronthal et al. | 363/59 |

* cited by examiner

*Primary Examiner* — Thomas J Hiltunen

(57) ABSTRACT

In one embodiment, the present invention includes a circuit for suppressing noise with adaptive charge-pump regulation. The circuit comprises an oscillator circuit, a charge pump, an amplifier, a current mirror, and a filter. The charge-pump receives an oscillating signal and provides an output voltage. The amplifier is responsive to the output voltage and a reference voltage and provides a control signal. The control signal alters a frequency of the oscillator and the output voltage is responsive to this frequency. The current mirror and filter suppress a noise component of the output voltage. The current mirror provides a supply current to a regulator loop. The regulator loop is operable to generate a consistent regulator voltage. In this manner, the adaptive charge-pump allows for a more consistent, noise free, regulator voltage.

20 Claims, 5 Drawing Sheets

CIRCUIT AND METHODS OF ADAPTIVE CHARGE-PUMP REGULATION

CROSS REFERENCE TO RELATED APPLICATIONS

This application claims the benefit of priority from U.S. Provisional Application No. 61/019,046, filed Jan. 4, 2008, entitled "Regulation Scheme Based on Adaptive Pumping" the entire disclosure of which is hereby incorporated herein by reference.

BACKGROUND

The present invention relates to charge-pump circuits, and in particular, to circuits and methods of adaptive charge-pump regulation.

Unless otherwise indicated herein, the approaches described in this section are not prior art to the claims in this application and are not admitted to be prior art by inclusion in this section.

A charge-pump is used in a wide variety of applications. A charge-pump receives a reference voltage input and provides an output voltage to a load circuit of that is a multiple (integer or non-integer) of the reference voltage. A charge-pump may be used as a source for a voltage regulator loop. The voltage regulator loop can operate to provide a consistent desired output voltage over changes in process, voltage, and temperature ("PVT").

Charge-pumps may use switching circuits to create the output voltage. The switching circuits may cause switching noise on the output of the charge pump. If the charge pump is used as a source for a voltage regulator loop, the switching noise may result in noise on the output of the voltage regulator. The noise on the output of the voltage regulator may cause faulty operation for system circuitry which depend on the quality of the output voltage of voltage regulator.

Some systems include filtering of the output voltage in order to provide a more consistent regulated voltage. However, the filters themselves may include active devices which depend on an acceptable level of consistency from the charge-pump.

Thus, there is a need for improved charge-pump circuitry. The present invention solves these and other problems by providing circuits and methods for adaptive charge-pump regulation.

SUMMARY

Embodiments of the present invention improve circuits and methods of adaptive charge-pump regulation. In one embodiment, the present invention includes a circuit. The circuit comprises an oscillator circuit, a charge pump, an amplifier, a current mirror, and a filter. The charge-pump is coupled to receive an oscillating signal from the oscillator circuit. The charge-pump is operable to provide an output voltage. The amplifier is responsive to the output voltage and a reference voltage. The amplifier is operable to provide a control signal. The control signal is coupled to alter a frequency of the oscillator. The current mirror is responsive to the output voltage of the charge-pump and operable to output a relatively constant current and suppress noise from the output voltage. The filter is arranged between the charge-pump and the current mirror. The filter is operable to further suppress noise from the output voltage. The current mirror is operable to isolate the filter from a load circuit in communication with the current mirror. The load circuit includes a regulator loop operable to generate a consistent regulated voltage. The output voltage is responsive to the frequency of the oscillator.

In one embodiment, the circuit further includes a voltage source and a level shifter circuit. The voltage source is coupled to receive the control signal and provide a voltage to the oscillator circuit. The oscillator provides a second oscillating signal that varies in peak to peak voltage in response to the voltage provided by the voltage source. The level shifter circuit is coupled to receive the second oscillating signal from the oscillator circuit and coupled to provide the oscillating signal to the charge-pump. This is done in response to the second oscillating signal such that the oscillating signal does not vary in peak to peak voltage.

In another embodiment, the circuit further comprises a voltage source. The voltage source provides a voltage to the oscillator circuit and the charge-pump. The output voltage is responsive to the voltage. The voltage is responsive to the control signal.

In one embodiment, the voltage source is a transistor having a control terminal coupled to receive the control signal, a first terminal coupled to a reference voltage, and a second terminal coupled to provide the voltage to the oscillator circuit and the charge-pump circuit.

In another embodiment, the circuit further includes a capacitor. The capacitor is coupled between an output terminal of the amplifier and an output terminal of the charge-pump. The capacitor stabilizes the output voltage.

In another embodiment, the circuit further comprises a voltage reference and a feedback network. The voltage reference comprises a first transistor coupled as a diode. The voltage reference provides the reference voltage to the amplifier. The feedback network comprises a second transistor coupled as a diode. The feedback network is coupled to receive the output voltage and is coupled to provide an indication of the output voltage to the amplifier. The first and second transistors provide a matching voltage drop which tracks over manufacturing variations.

In one embodiment, the present invention includes a method of suppressing noise. The method comprises pumping, adjusting, altering, suppressing, and filtering. The pumping includes pumping charge according to an oscillating signal. The pumping results in an output voltage having an associated noise component. The adjusting includes adjusting a source voltage in response to the output voltage and a reference voltage. The altering includes altering a frequency of the oscillator signal in response to the adjusting of the source voltage. The suppressing includes suppressing the noise component of the output voltage with a suppression apparatus. The suppressing includes supplying a relatively constant current in response to the output voltage. The filtering includes filtering the output voltage with a filter apparatus to further suppress the noise component; and isolating the filter apparatus from a load circuit receiving the relatively constant current source. Isolating the filter apparatus includes isolating the filter apparatus from a regulator loop operable to generate a consistent regulated voltage. The output voltage is responsive to the altering of the frequency of the oscillating signal.

In one embodiment, the adjusting of the source voltage includes amplifying, converting, and shifting. The amplifying includes amplifying a difference between the output voltage and the reference voltage to generate a control signal. The converting includes converting the control signal to the source voltage. The source voltage provides power to an oscillator apparatus in response to the control signal. The oscillator apparatus provides a second oscillating signal that varies in peak to peak voltage in response to the voltage provided by the sourcing. The shifting includes shifting the peak to peak voltage level of the second oscillating signal to a second peak to peak voltage level of the oscillating signal such that the oscillating signal does not vary in peak to peak voltage.

In another embodiment, the method further comprises altering. The altering includes altering the charge of the pumping in response the adjusting of the source voltage. The output voltage is responsive to the altering of the charge.

In yet another embodiment, the generating of the source voltage includes adjusting. Adjusting the source voltage depends on whether the output voltage matches the reference voltage. The source voltage provides power to an oscillator apparatus and a charge-pump. The oscillator apparatus provides the oscillator signal and the charge-pump provides the pumping charge. The output voltage is responsive to the source voltage and the source voltage is responsive to the adjusting.

In one embodiment, the method further comprises coupling an output terminal associated with the output voltage to an output terminal associated with the adjusting of the source voltage. The coupling includes a capacitor to stabilize the output voltage.

In another embodiment, the method further comprises generating the reference voltage and coupling the output voltage through a feedback network. The generating includes providing a first voltage drop across a first transistor coupled as a diode. The coupling provides a second voltage drop across a second transistor coupled as a diode. The first and second voltage drops match. The match tracks over manufacturing variations.

In one embodiment the present invention includes a communication system. The communication system comprises a transmitter, a receiver, an oscillator circuit, a charge-pump, an amplifier, a current mirror, and a voltage regulator. The charge-pump is coupled to receive an oscillating signal from the oscillator circuit. The charge-pump is operable to provide an output voltage to the current mirror. The amplifier is responsive to the output voltage and a reference voltage. The amplifier is operable to provide a control signal. The control signal is coupled to alter a frequency of the oscillator. The current mirror is arranged between the charge-pump and a voltage regulator and is operable to supply a relatively constant current to the voltage regulator. The current mirror suppresses noise from the output voltage of the charge-pump. The voltage regulator is in communication with at least one of the transmitter and the receiver. The voltage regulator is operable to provide a relatively constant voltage to the at least one of the transmitter and the receiver.

The following detailed description and accompanying drawings provide a better understanding of the nature and advantages of the present invention.

DETAILED DESCRIPTION

Described herein are circuits and methods of adaptive charge-pump regulation. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
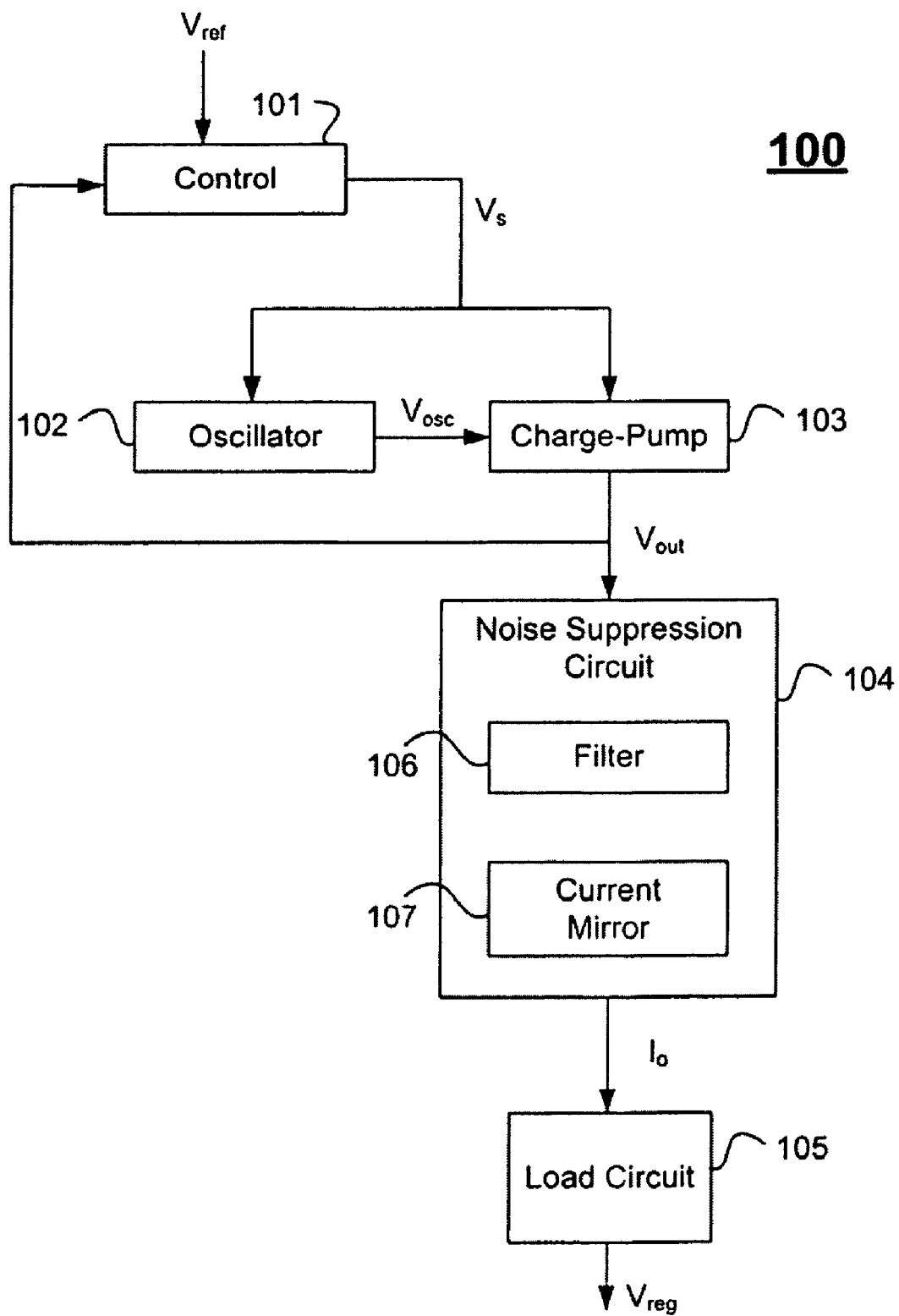
FIG. 1 illustrates a block diagram of a circuit for providing adaptive charge-pump regulation according to one embodiment of the present invention.

FIG. 1 illustrates a block diagram 100 of a circuit for providing adaptive charge-pump regulation according to one embodiment of the present invention. Block diagram 100 includes control circuit 101, oscillator 102, charge pump 103, noise suppression circuit 104, and load circuit 105.

Charge-pump 103 is coupled to receive an oscillating signal $V_{osc}$ from oscillator 102. Oscillator 102 may be a ring oscillator, for example. The charge-pump 103 is operable to provide an output voltage $V_{out}$. Control circuit 101 is coupled to provide a source voltage $V_s$ to oscillator 102 and charge pump 103. Control circuit 101 adjusts $V_s$ in response to a reference voltage $V_{ref}$ and the output voltage $V_{out}$. The voltage $V_{out}$ may be controlled to a tolerance of less than 10 mV, for example.

$V_{out}$ responds to changes in $I_o$ by providing adaptive charge-pump operation. For example, if $I_o$ increases and causes $V_{out}$ to drop, control circuit 101 senses the drop and increases the voltage $V_s$ accordingly. The increase in voltage $V_s$ may increase the frequency of the oscillator signal $V_{osc}$. The increased frequency allows charge-pump 103 to increase the amount of charge pumped and $V_{out}$ increases accordingly. In one embodiment, the change in voltage $V_s$ may also increase the amount of charge pumped by charge-pump 103.

In one embodiment, charge-pump 100 receives an input voltage $V_s$ and produces an output voltage $V_{out}$ of substantially twice the input voltage $V_{ref}$. A noise suppression circuit 104 positioned between the charge-pump 103 and the load circuit 105 is operable to suppress voltage ripple from the charge-pump 103 without interfering with the stability and function of the load circuit 105. In another embodiment, noise suppression circuit 104 includes a current mirror 107 and a filter 106 (e.g. a bypass capacitor). The current mirror 107 operates to isolate the filter 103 from load circuit 105 allowing, for example, the use of a large bypass capacitor without impairing the functionality of load circuit 105. In one embodiment, noise suppression circuit 104 is operable to provide a relatively constant current $I_o$ to allow proper functioning of load circuit 105. One example of load circuit 105 is a voltage regulator loop providing a constant output $V_{reg}$.

Figure 2:
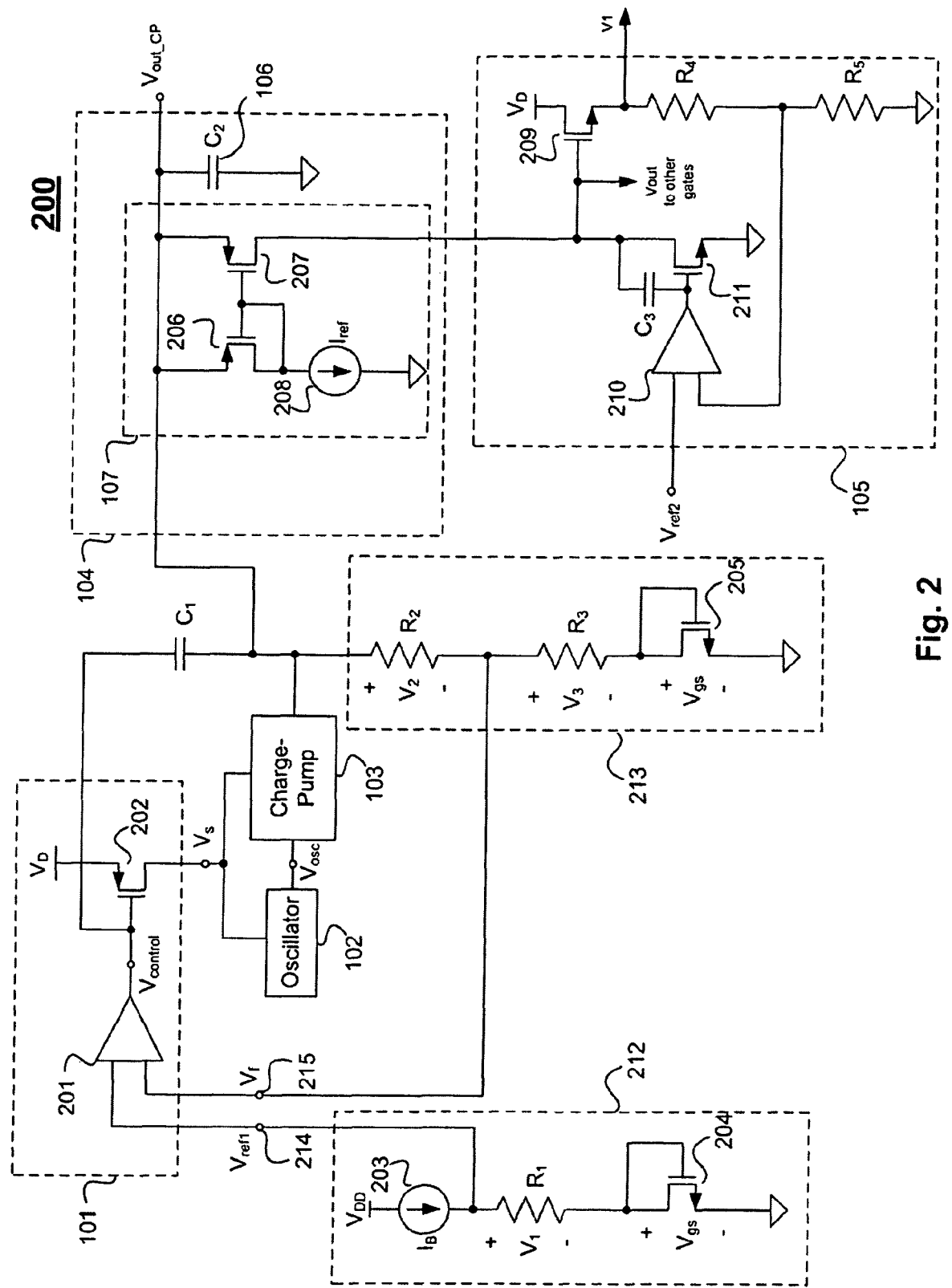
FIG. 2 illustrates a circuit for providing adaptive charge-pump regulation according to another embodiment of the present invention.

FIG. 2 illustrates a circuit 200 for providing adaptive charge-pump regulation according to another embodiment of the present invention. Circuit 200 includes control circuit 101, oscillator 102, charge-pump 103, noise suppression circuit 104, load circuit 105, voltage reference 212, feedback network 213, and compensation capacitor $C_1$. Noise suppression circuit 104 may also include current mirror 107.

Load circuit 105 and suppression circuit 104 operate similar to that described in U.S. Pat. No. 7,068,094, entitled "Charge-Pump Current Source" the entire disclosure of which is hereby incorporated herein by reference.

The voltage regulator loop of load circuit 105 can operate to provide a consistent desired regulated voltage over changes in process, voltage, and temperature ("PVT"). Current mirror 107 provides a relatively constant current, $I_o$, over PVT variations.

Control circuit 101 includes amplifier 201 and transistor 202. Amplifier 201 is coupled to receive a reference voltage $V_{ref1}$ and a feedback voltage $V_f$. A control voltage $V_{control}$ is generated by amplifier 201 such that $V_{ref1}$ and $V_f$ match. The output terminal of amplifier 201 is coupled to the gate terminal of transistor 202. Transistor 202 passes current from a reference voltage $V_D$ to source voltage $V_s$ which is used to power oscillator 102 and charge-pump 103. The value of source voltage $V_s$ is controlled by voltage $V_{control}$.

A control loop is formed from feedback network 213, control circuit 101, oscillator 102, and charge-pump 103. Capacitor $C_1$ is coupled between the output terminal of amplifier 201 and the output terminal of charge-pump 103. Capacitor $C_1$ compensates the control loop and improves stability. The control loop maintains a charge pump voltage $V_{out\_CP}$ such that transistor 207 does not go into the triode region of operation. If transistor 207 enters the triode region then current mirror 107 may reduce the amount in which it isolates the node at $V_{out\_CP}$ from the node at the gate of transistor 209 ("Vout to other gates"). Such isolation is desired to reduce noise at the charge pump output from other output nodes. Also, since $V_{out\_CP}$ is well controlled, the oscillator 102 and charge-pump 103 may be utilizing less power to operate and therefore power consumption may be reduced.

Voltage reference 212 generates a reference voltage $V_{ref}$. Voltage reference 212 includes current source 203, resistor $R_1$, and transistor 204. Current source 203 generates a bias current $I_b$ that creates a voltage drop $V_1$ across resistor $R_1$ and another voltage drop $V_2$ across transistor 204 which is coupled as a diode. These voltage drops (i.e. $V_1$ and $V_2$) create reference voltage $V_{ref}$ at terminal 214. Terminal 214 is coupled to one input terminal of amplifier 201.

Feedback network 213 provides feedback voltage $V_f$ from output voltage $V_{out\_CP}$. Feedback network 213 includes resistor $R_2$, resistor $R_3$, and transistor 205 coupled in series. Transistor 205 is coupled as a diode. Feedback network 213 divides voltage $V_{out\_CP}$ to voltage $V_f$ at terminal 215 so that it may be compared to voltage $V_{ref1}$.

In one embodiment, transistors 204 and 205 may provide a matching voltage drop $V_{GS}$ such that the comparison of voltage $V_{ref1}$ and $V_f$ tracks over PVT.

The following are example voltage values:

$V_D$ = 1.8 V,
$V_{GS}$ = 0.6 V,
$V_{out\_CP}$ = 2.4 V,
$V_{out}$ = 2.1 V,
$V_1$ = 1.5 V, $V_{ref}$ = $V_f$ = 0.9 V,
$V_1$ = 0.3 V,
$V_2$ = 1.5 V,
$V_3$ = 0.3 V.

Figure 3:
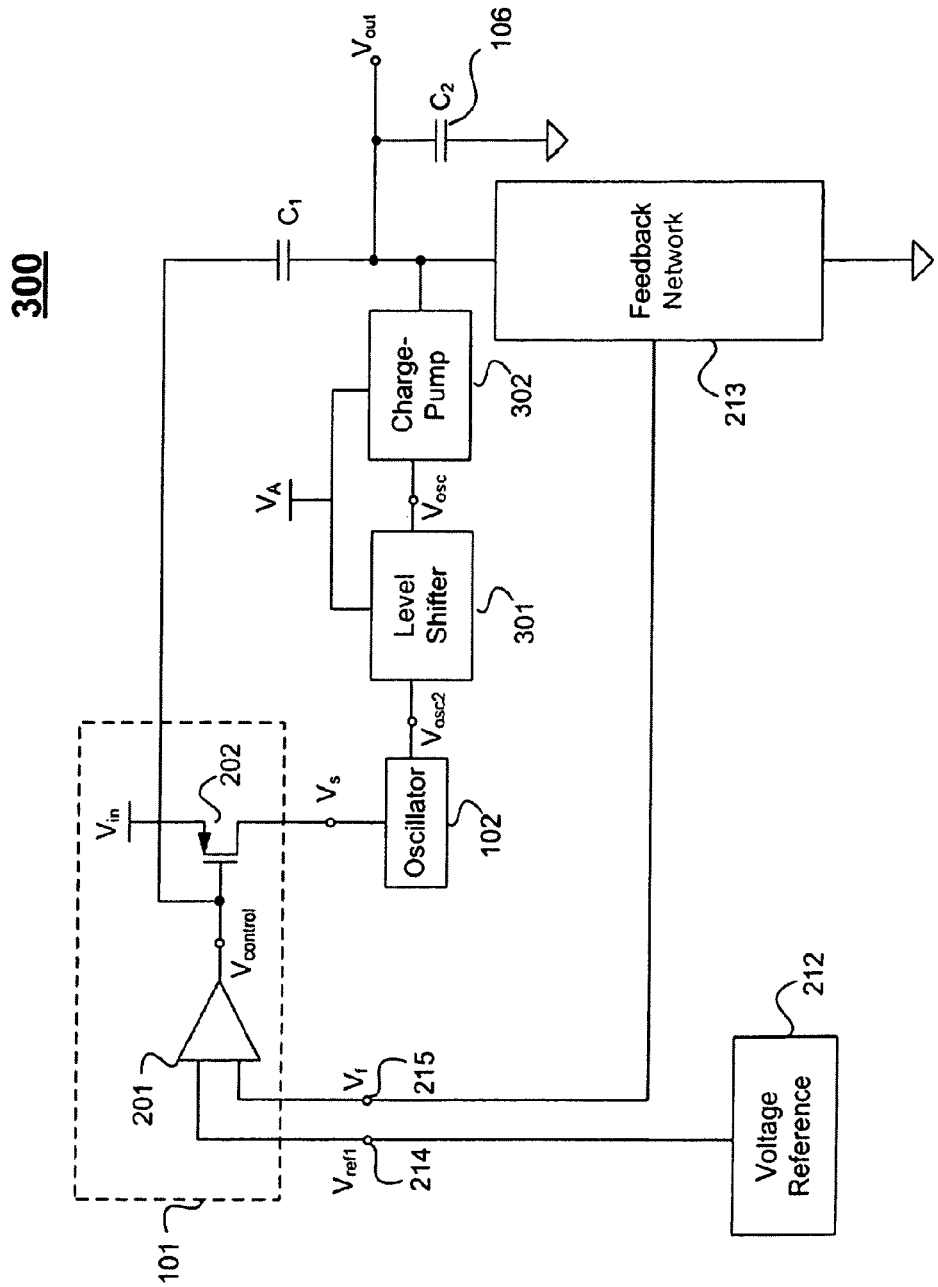
FIG. 3 illustrates a portion of a circuit which may be implemented to provide adaptive charge-pump regulation according to another embodiment of the present invention.

FIG. 3 illustrates a portion of a circuit 300 which may be implemented to provide adaptive charge-pump regulation according to another embodiment of the present invention. Circuit 300 includes control circuit 101, oscillator 102, level shifter 301, charge-pump 103, voltage reference 212, feedback network 213, compensation capacitor $C_1$.

In this embodiment, control circuit 101 provides source voltage $V_s$ to oscillator 102 and not to charge-pump 302. Source voltage $V_s$ influences the frequency of oscillating signal $V_{osc2}$ that varies in peak to peak voltage in response to the source voltage $V_s$.

Level shifter circuit 301 receives oscillating signal $V_{osc2}$ from oscillator 102 and provides oscillating signal $V_{osc}$ to charge-pump 103. Oscillating signal $V_{osc}$ does not vary in peak to peak voltage. Charge pump 103 and level shifter 301 are supplied by voltage $V_A$. Output voltage $V_{out}$ is responsive to changes the frequency of $V_{osc}$. The frequency of $V_{osc}$ is responsive to changes in source voltage $V_s$, and $V_s$ is responsive to changes in the output voltage $V_{out}$.

Figure 4:
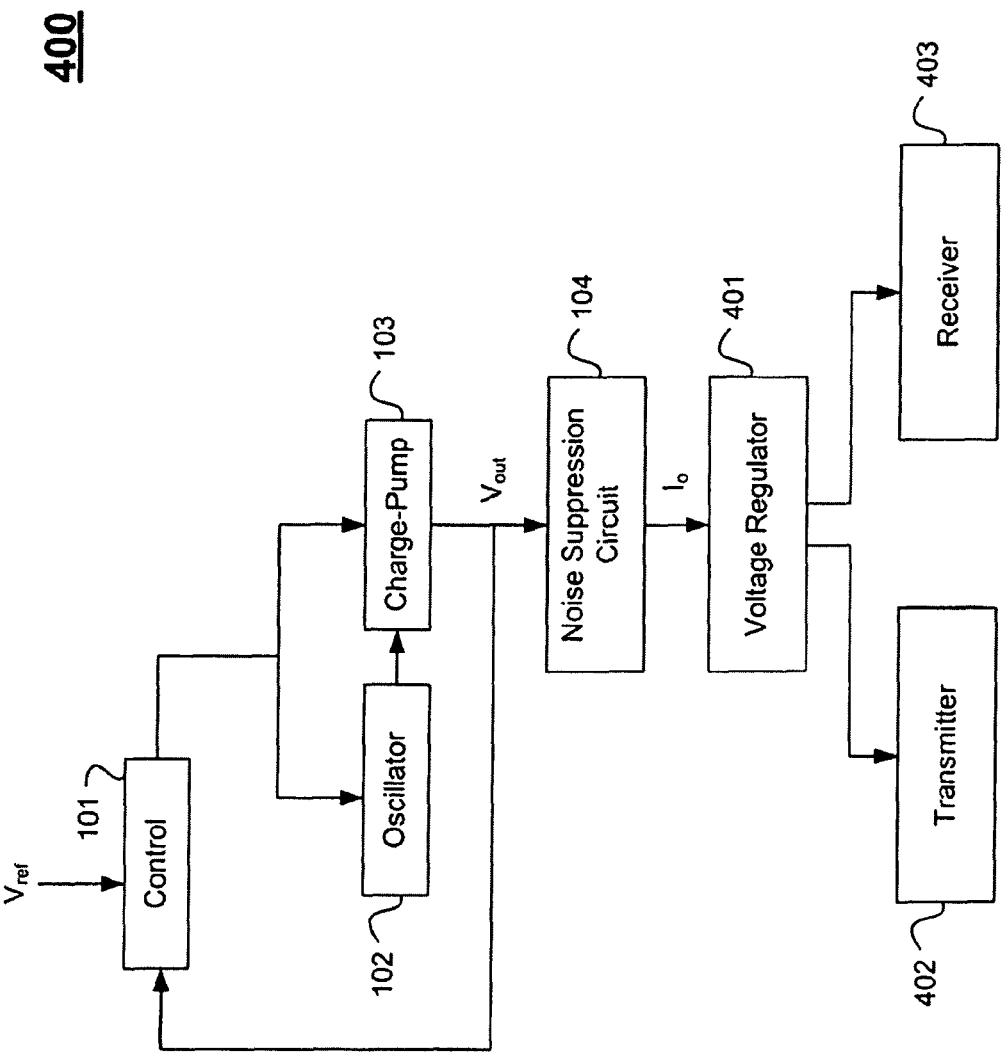
FIG. 4 illustrates a block diagram of a system utilizing adaptive charge-pump regulation according to one embodiment of the present invention.

FIG. 4 illustrates a block diagram of a system 400 utilizing adaptive charge-pump regulation according to one embodiment of the present invention. System 400 includes control circuit 101, oscillator 102, charge-pump 103, noise suppression circuit 104, voltage regulator 401, transmitter 402, and receiver 403.

Adaptive charge-pump regulation as illustrated in block diagram 100, circuit 200, and circuit 300 may be used to provide power to a communication system as illustrated in FIG. 4. In one embodiment, regulator 401, transmitter 402 and receiver 403 are the load circuit 105. Voltage regulator 401 provides power to transmitter 402 and receiver 403.

Communication system 400 may be implemented in several types of communication systems. For example, communication system 400 may be an Ethernet transceiver compliant with IEEE 1000BaseT.

Control circuit 101, oscillator 102, and charge-pump 103 provide output voltage $V_{out}$. Noise suppression circuit 104 reduces the noise content of the output voltage $V_{out}$ and provides a current $I_o$ to power voltage regulator 401. Voltage regulator 401 converts the current source $I_o$ into a reference voltage that can be supplied to each of a receiver 403 and a transmitter 402. Voltage regulator 401 may produce a single voltage supply for both transmitter 402 and receiver 403. Regulator 401 may be a multiple output regulator and supply separate supplies to transmitter 402 and receiver 403.

Figure 5:
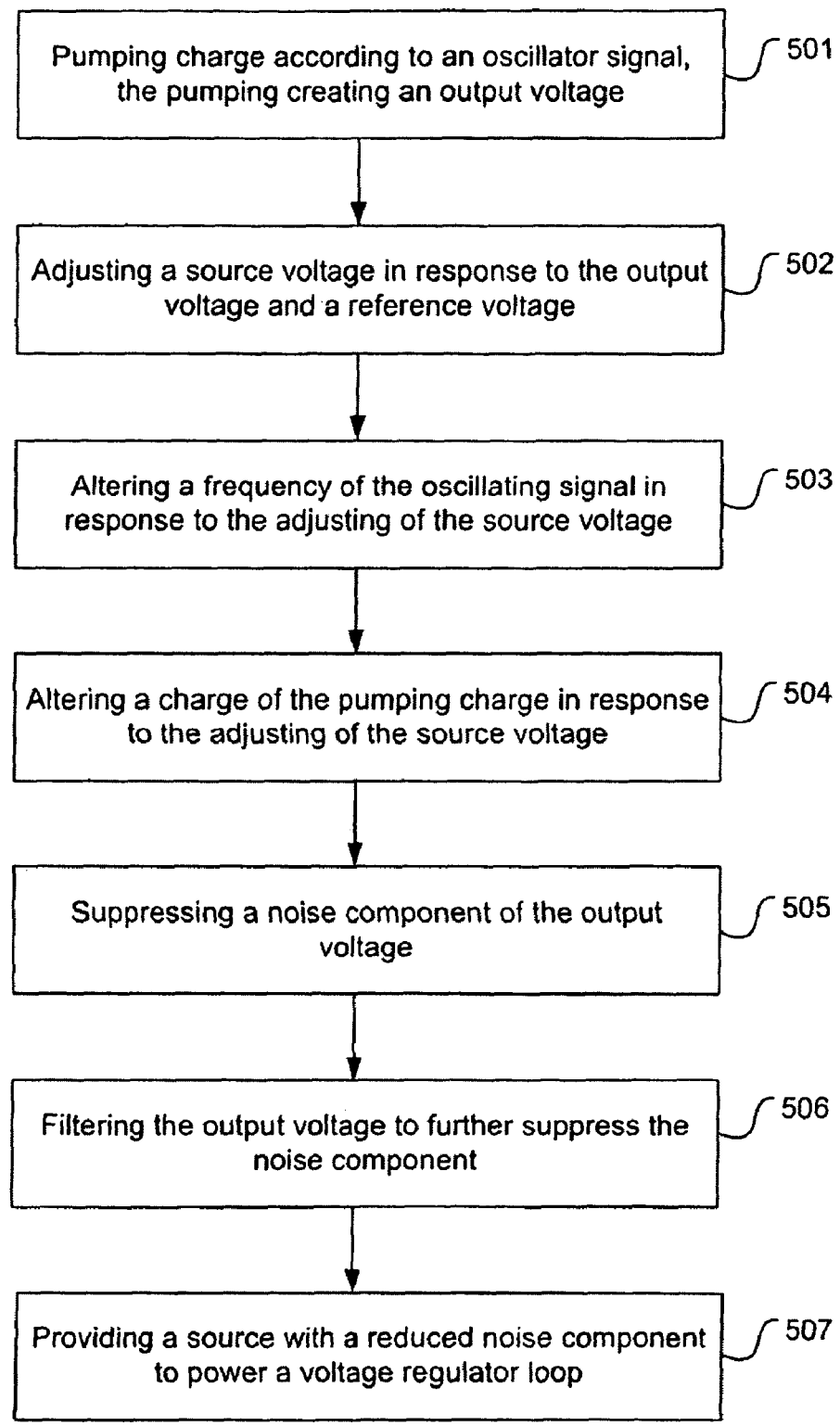
FIG. 5 illustrates a method for performing adaptive charge-pump regulation according to another embodiment of the present invention.

FIG. 5 illustrates a method 500 for performing adaptive charge-pump regulation according to another embodiment of the present invention.

At step 501, charge is pumped according to an oscillator signal. The pumping creates an output voltage. The amount of charge and the corresponding output voltage depends on the load current, the frequency of the oscillating signal, and the amount of charge pumped during each cycle.

At step 502, a source voltage is adjusted in response to the output voltage and a reference voltage. If a divided voltage corresponding to the output voltage is lower than the reference voltage, the source voltage may be increased. If the divided voltage corresponding to the output voltage is higher than the reference voltage, the source voltage may be decreased.

At step 503, a frequency of the oscillating signal is altered in response to the adjusting of the source voltage. For example, the source voltage may be a supply voltage for a ring oscillator such that when the source voltage is reduced the corresponding frequency of the ring oscillator is proportionally reduced. If the source voltage is increased the corresponding frequency of the ring oscillator is proportionally increased.

At step 504, a charge of the pumping charge of step 501 is altered in response to the adjusting of the source voltage. For example, the source voltage may be a supply voltage of a charge pump. When the supply voltage is reduced to the charge pump, the corresponding amount of charge may also be reduced. Both step 503 and 504 may adjust the output voltage.

At step 505, a noise component of the output voltage is suppressed. Since the output voltage may be produced with switching or other non-linear methods, the output voltage may contain a noise component. Suppressing of the noise component may be accomplished using a current mirror as previously described.

At step 506 the output voltage is filtered. The filtering of the output voltage also helps to suppress noise. If the filtering utilizes a capacitor, the suppressing of step 505 may also isolate the capacitor from a load circuit placed after the suppression circuit related to step 505.

At step 507, a current source is provided to a voltage regulator loop. The current source may have a reduced noise component due to step 505 and 506. The regulator loop may have several source followers which may be utilized to provide several regulated outputs.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A circuit comprising:
an oscillator circuit;
a charge pump coupled to receive an oscillating signal from said oscillator circuit, said charge pump operable to provide an output voltage;
an amplifier responsive to said output voltage and a reference voltage, said amplifier operable to provide a control signal, said control signal coupled to alter a frequency of said oscillator circuit;
a current mirror responsive to said output voltage of said charge pump, said current mirror operable to output a constant current and suppress noise from said output voltage;
a filter arranged between said charge pump and said current mirror, said filter operable to further suppress noise from said output voltage;
a voltage reference, said voltage reference comprising a first device, said voltage reference providing said reference voltage to said amplifier; and
a feedback network comprising a second device, said feedback network coupled to receive said output voltage and to provide an indication of said output voltage to said amplifier,
wherein said first device and said second device provide a matching voltage drop that tracks over manufacturing variations,
wherein said current mirror is operable to isolate said filter from a load circuit in communication with said current mirror, and said load circuit includes a regulator loop operable to generate a consistent regulated voltage, and
wherein said output voltage is responsive to said frequency of said oscillator circuit.

2. The circuit of claim 1 further comprising:
a voltage source coupled to receive said control signal and provide a voltage to said oscillator circuit, said oscillator circuit providing a second oscillating signal that varies in peak to peak voltage in response to said voltage provided by said voltage source; and
a level shifter circuit configured to receive said second oscillating signal from said oscillator circuit and coupled to provide said oscillating signal to said charge pump in response to said second oscillating signal such that said oscillating signal does not vary in peak to peak voltage.

3. The circuit of claim 1 further comprising a voltage source providing a voltage to said oscillator circuit and said charge pump, said output voltage being responsive to said voltage, said voltage being responsive to said control signal.

4. The circuit of claim 3, wherein the reference voltage comprises a first reference voltage, wherein said voltage source is a transistor having a control terminal coupled to receive said control signal, a first terminal coupled to a second reference voltage, and a second terminal coupled to provide said voltage to said oscillator circuit and said charge pump circuit.

5. The circuit of claim 1 further comprising a capacitor coupled between an output terminal of said amplifier and an output terminal of said charge pump, said capacitor stabilizing said output voltage.

6. The circuit of claim 1, wherein:
the first device comprises a first transistor coupled as a diode;
the second device comprises a second transistor coupled as a diode; and
said first transistor and said second transistor provide the matching voltage drop that tracks over manufacturing variations.

7. A method of suppressing noise comprising:
pumping charge according to an oscillating signal, said pumping resulting in an output voltage having an associated noise component;
adjusting a source voltage in response to said output voltage and a reference voltage;
altering a frequency of said oscillator signal in response to said adjusting of said source voltage;
suppressing the noise component of said output voltage, said suppressing including supplying a relatively constant current to a load circuit in response to said output voltage;
filtering the output voltage to further suppress the noise component;
generating said reference voltage, said generating comprising providing a first voltage drop across a first device; and
coupling said output voltage through a feedback network, said coupling providing a second voltage drop across a second device,
wherein said first voltage drop and said second voltage drop correspond to a matching voltage drop that tracks over manufacturing variations, and
wherein said output voltage is responsive to said altering of said frequency of said oscillator signal.

8. The method of claim 7, wherein said adjusting of said source voltage includes:
amplifying a difference between said output voltage and said reference voltage to generate a control signal;
converting said control signal to said source voltage, said source voltage providing power to an oscillator apparatus in response to said control signal, said oscillator apparatus providing a second oscillating signal that varies in peak to peak voltage in response to said output voltage; and
shifting said peak to peak voltage level of said second oscillating signal to a second peak to peak voltage level of said oscillating signal such that said oscillating signal does not vary in peak to peak voltage.

9. The method of claim 7 further comprising:
altering said charge of said pumping in response said adjusting of said source voltage,
wherein said output voltage is responsive to said altering of said charge.

10. The method of claim 7, wherein said adjusting of said source voltage includes:
adjusting said source voltage depending on whether said output voltage matches said reference voltage, said source voltage providing power to an oscillator apparatus and a charge pump, said oscillator apparatus providing said oscillator signal and said charge pump providing said pumping charge, said output voltage being responsive to said source voltage, said source voltage being responsive to said adjusting.

11. The method of claim 7 further comprising coupling a first output terminal associated with said output voltage to a second output terminal associated with said adjusting of said source voltage, wherein a capacitor stabilizes said output voltage.

12. The method of claim 7, wherein:
the first device comprises a first voltage drop across a first transistor configured as a diode;
the second device comprises a second transistor configured as a diode; and
said first transistor and second transistor provide the matching voltage drop that tracks over manufacturing variations.

13. A communication system comprising:
a transmitter;
a receiver;
an oscillator circuit;
a charge pump coupled to receive an oscillating signal from said oscillator circuit, said charge pump operable to provide an output voltage to a current mirror;
an amplifier responsive to said output voltage and a reference voltage, said amplifier operable to provide a control signal, said control signal coupled to alter a frequency of said oscillator circuit;
a voltage reference, said voltage reference comprising a first device, said voltage reference providing said reference voltage to said amplifier; and
a feedback network comprising a second device, said feedback network coupled receive said output voltage and to provide an indication of said output voltage to said amplifier,
wherein:
said first device and second device provide a matching voltage drop that tracks over manufacturing variations,
said current mirror is arranged between the charge pump and a voltage regulator, the current mirror operable to (i) supply a relatively constant current to the voltage regulator and (ii) suppress noise from the output voltage of the charge pump, and
said voltage regulator further in communication with at least one of the transmitter and the receiver, the voltage regulator operable to provide a relatively constant voltage to the at least one of the transmitter and the receiver.

14. The system of claim 13 further comprising:
a filter arranged between the charge pump and the current mirror, the filter operable to further suppress noise from the output voltage of the charge pump.

15. The system of claim 13, wherein the voltage regulator includes a regulator loop operable to generate a consistent regulated voltage.

16. The system of claim 13 further comprising:
a voltage source coupled to receive said control signal and coupled to provide a voltage to said oscillator circuit, said oscillator circuit providing a second oscillating signal that varies in peak to peak voltage in response to said voltage provided by said voltage source;
a level shifter circuit coupled to receive said second oscillating signal from said oscillator circuit and coupled to provide said oscillating signal to said charge pump in response to said second oscillating signal such that said first oscillating signal does not vary in peak to peak voltage.

17. The system of claim 13 further comprising a voltage source providing a voltage to said oscillator circuit and said charge pump, said output voltage being responsive to said voltage, said voltage being responsive to said control signal.

18. The system of claim 17, wherein the reference voltage comprises a first reference voltage, wherein said voltage source is a transistor having a control terminal coupled to receive said control signal, a first terminal coupled to a second reference voltage, and a second terminal coupled to provide said voltage to said oscillator circuit and said charge pump circuit to thereby provide power to said oscillator circuit and said charge pump.

19. The system of claim 13 further comprising a capacitor coupled between an output terminal of said amplifier and an output terminal of said charge pump, said capacitor stabilizing said output voltage.

20. The system of claim 13, wherein:
the first device comprises a first transistor coupled as a diode;
the second device comprises a second transistor coupled as a diode; and
said first transistor and said second transistor provide the matching voltage drop that tracks over manufacturing variations.

* * * * *